Patented Nov. 9, 1937

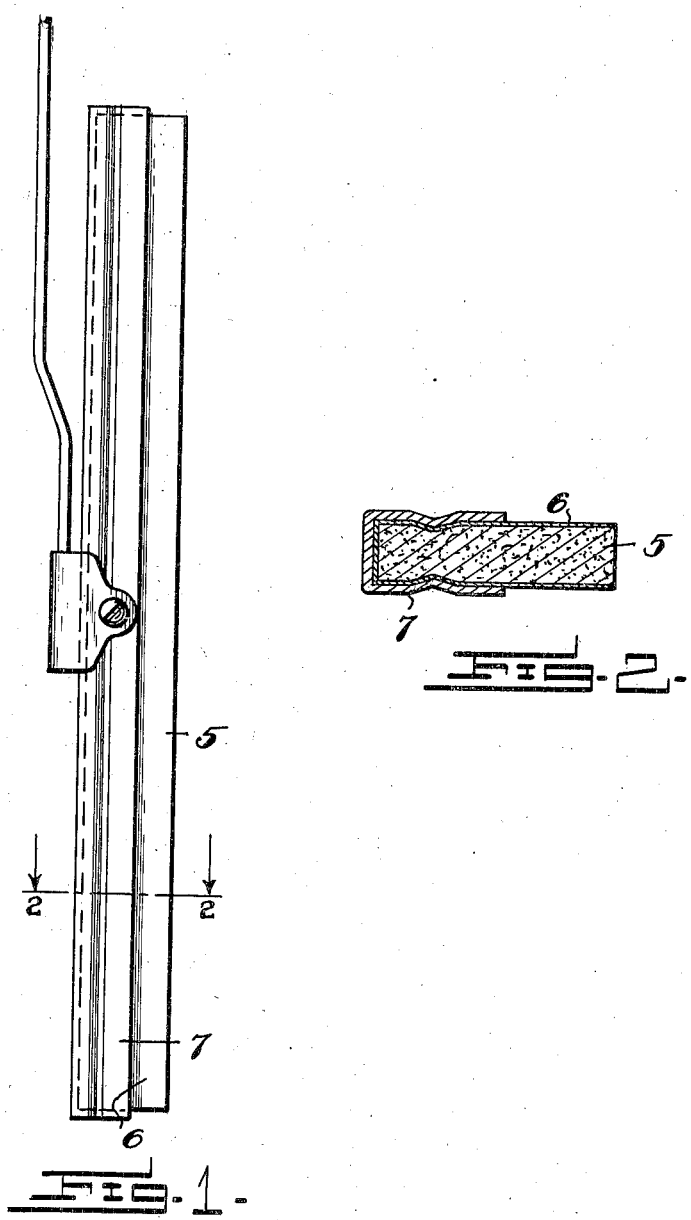

2,098,482

UNITED STATES PATENT OFFICE 2,098,482

METHOD OF AND MEANS FOR PREVENTING THE FORMATION OF SLEET ON MOBILE BODIES

Raymond I. Bashford, Philadelphia, Pa., assignor to Atlas Powder Company, Wilmington, Del., a corporation of Delaware Application April 25, 1934, Serial No. 722,405

10 Claims. (Cl. 15—250)

My invention relates to a method of and means for preventing the formation of adhering ice or snow on mobile bodies and especially on the windshields of automobiles, aeroplanes, and boats.

It is well known that in many localities, during the cooler season the formation of sleet on the portions of automobiles, aeroplanes and boats through which unobstructed vision is desired for proper operation, results in serious inconvenience to the operator and hazards to life and property.

The usual form of windshield wiper with its rubber, moisture-removing blade, while effective to remove rain water, is almost useless to remove sleet. Special blades electrically heated have been proposed. Blades equipped with liquid feeding devices for supplying low freezing liquids have been suggested. Liquids such as wood or grain alcohols or glycerine have been used with such devices.

My invention consists of applying to the surface of a windshield or other portion of an automobile, aeroplane or boat, through which it is desired to maintain visibility during sleet forming periods, or which it is desired to keep free of ice or sleet, a solid material soluble in water, the water solution of which has a lower freezing point than water alone.

The method of application of such solid may vary. It may be applied frequently by hand from a mass of the material formed into a stick, cake or bar. It may be in the pulverulent form at time of application. I prefer to make the material up in the form of strips or bars and replace the usual wiper blade with my prepared blade. This results in regular and frequent application of the material and better prevents the formation of adhering sleet than when application is by hand at irregular intervals.

To make such a stick, cake or wiper blade I take for example sorbitol, a hexahydric alcohol and at least partially dehydrate it by heating under a partial vacuum. To promote solidification of the same, I add, after dehydration of the sorbitol, a few seed crystals of sorbitol or mannitol. Upon cooling, the sorbitol which has been dehydrated sufficiently so that it will be solid at ordinary temperatures, will slowly solidify into a resinous appearing mass. It may be poured into suitable molds while liquid or it may be cut or sawed into the desired shape, for either hand application or for attachment to windshield wipers.

In order to prevent too rapid dissolving of the mass, thereby decreasing the length of time which a definite mass of substance would serve, I cover all surfaces of the mass except those surfaces immediately in contact with the windshield while the substance is being applied to prevent sleet formation, with a waterproof covering.

One application of the invention is illustrated in the accompanying drawing, wherein Fig. 1 is a side view of a windshield wiper blade, and Fig. 2 is a transverse sectional view therethrough.

In the drawing, 5 designates a strip or bar of solidified sorbitol having a protective web or wrapper 6 applied thereto and covering all portions thereof except the front edge, which contacts the windshield. The wrapper or covering 6 may be of waterproof paper, metal, metal foil, waterproof fabric or other suitable moisture proof material. 7 designates a holder for the wiper blade 5.

Instead of sorbitol, I may use a mixture of sorbitol and mannitol or I may elect to use a mixture of sorbitol and sugar, or I may use mannitol alone though I prefer sorbitol. An advantage of the use of such substances as these for the purposes recited is that they are solid at ordinary temperatures and may be formed into shapes of convenient size without the use of other substances as binders. It is difficult to find binding substances which will not leave streaks and smears upon the glass of a windshield.

While I have described the invention in connection with one of its most important uses, viz.; the prevention of sleet and ice formation on transparent surfaces such as the windows, windshields and the like of mobile bodies, it is to be understood that I contemplate its application in any relation where the prevention of ice and sleet formation is desirable. Where the emergency is great enough to justify the cost, I may use the substance recited to coat the leading edges of aeroplane wings to prevent ice formation thereon.

I do not restrict myself to the materials used as examples as it is apparent that many variations of the compositions may be used. The invention includes within its purview any modifications falling within either the terms or the spirit of the appended claims.

What I claim is:

1. The process of preventing the formation of adhering ice on the windshields of vehicles by repeatedly applying to the exposed portions of such windshields the solid, water-soluble hexahydric alcohol, sorbitol.

2. A sleet and ice formation preventative for vehicle windshields in stick formation adapted for application to a vehicle windshield and comprising a composition consisting of a hexahydric alcohol binder free and solid at ordinary temperature but soluble in water, the water solution of which has a lower freezing point than water alone.

3. A wind shield wiper comprising a mass having as a principal constituent thereof a solid, water-soluble, hexahydric alcohol.

4. A wind shield wiper comprising a mass having as a principal constituent thereof a solid, water-soluble, hexahydric alcohol and a water proof web covering the sides but not the applying edge of such mass.

5. The herein described process of preventing the formation of ice on exposed portions of vehicles, which consists of repeatedly applying to such exposed portions the exposed face of a body of sorbitol, while protecting the remaining faces of the sorbitol against too rapid dissolving by covering the same.

6. A windshield wiper comprising in the main a solid substantially dehydrated sorbitol.

7. A windshield wiper consisting of a solid body of sorbitol.

8. A windshield wiper comprising in the main a body of sorbitol and a waterproof protecting web covering all but the applying surface of said sorbitol.

9. A windshield wiper in the form of an elongated blade, and composed principally of solid and substantially dehydrated sorbitol.

10. A windshield wiper consisting of a mixture of water soluble alcohols solid at ordinary temperatures, the water solution of which has a lower freezing point than water alone.

RAYMOND I. BASHFORD.